Figure 6:
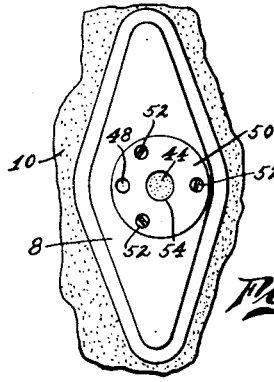

Jan. 8, 1935. J. L. SWEZEY 1,987,163

PRESSURE INDICATOR VALVE

Filed Aug. 27, 1932

Inventor
J. L. Swezey
By Fred D. Hayn
Attorney

Patented Jan. 8, 1935

1,987,163

UNITED STATES PATENT OFFICE 1,987,163

PRESSURE INDICATOR VALVE

Joel L. Swezey, Compton, Calif., assignor to Pneumatic Indicator Company, a corporation Application August 27, 1932, Serial No. 630,645

8 Claims. (Cl. 200—58)

My invention relates to pressure signalling indicators, and more particularly to those adapted to be associated with the valve stems of motor vehicle tires, whereby the driver may be instantly warned that a tire has become deflated or deflation to a dangerous point has been reached, said invention being especially useful in connection with trucks, where the noise of vehicle travel prevents the driver from being aware that one or more tires have become deflated, thus affording a marked saving in the cost of operation, the life of the tires being materially increased.

It accordingly is an object of my invention to provide a novel form of pressure indicator valve which may be intimately associated with the usual valve stem of a tire, or any other support, said stem or support preferably being provided with cut out and cut away portions to house a housing or casing, preferably of insulating material, an electric lead or signal indicating means being connected to a suitable terminal associated in any preferred way with said housing, said housing being provided with a suitable switch mechanism, controlled by any preferred means, such as a resilient insulating disk for controlling said switch mechanism as said disk responds to fluctuating pressures, such as are present in the conventional tire of a motor vehicle.

If desired, also, the valve stem may be provided with an inclined or offset passage, communicating with the central bore of said stem and with the interior of the tire with which said stem is associated.

The above and further objects and advantages of my invention, as will hereinafter more fully appear, I attain by the construction described in the specification, and illustrated on the drawing, forming a part of my application.

Figure 1:
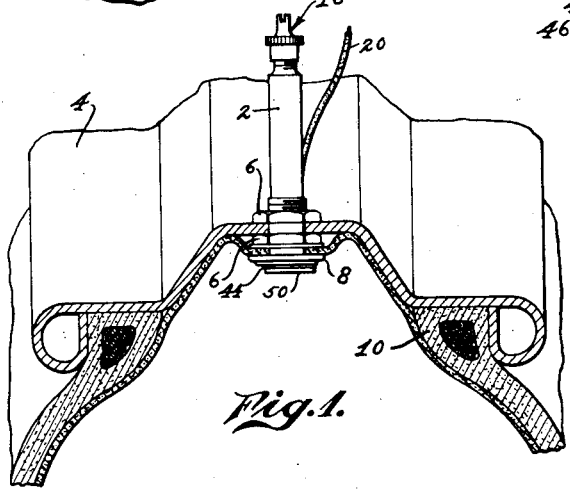
Figure 4:
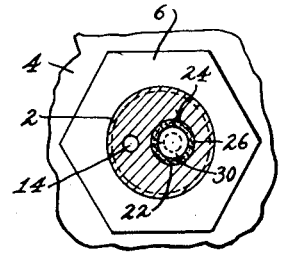
Figure 5:
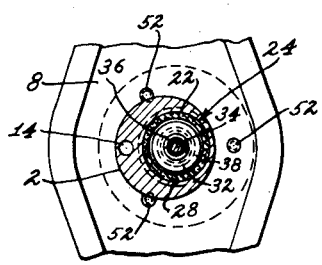

Reference is had to the accompanying drawing, in which similar reference characters denote similar parts. In the drawing, Fig. 1 is a fragmentary cross-sectional view of my invention applied to a tire rim and tire, Fig. 2 is a similar view upon a somewhat enlarged scale, illustrating the position of the electrodes or circuit closing devices when the tire is deflated, electric circuit being established, Fig. 3 is a view similar to Fig. 2, but illustrating the position of the parts when the tire is inflated, Fig. 4 is a cross-sectional view taken on the line 4—4, Fig. 3, looking in the direction of the arrows, Fig. 5 is a similar view, taken on the line 5—5, Fig. 3, also looking in the direction of the arrows, and Fig. 6 is a bottom plan view of Fig. 1.

Describing my invention more in detail, my invention is preferably adapted to be associated with the valve stem of the tire of a motor vehicle, but in its broader aspects may be associated with any support in practice preferred or needed, and where the indication of fluctuating pressures is a desideratum.

As seen in the drawing, the valve stem or support 2 is associated in any preferred way with the tire rim 4, as by means of the conventional lock nuts 6, secured to said stem 2, which stem may be provided with a conventional flange 8 extending within the tire 10. It will, of course, be understood that the valve stem 2 may in practice be associated with the tire and rim in any way and by any means preferred, said stem, tire and rim, except as hereinafter more fully explained, may be of the usual or conventional construction.

Figure 2:
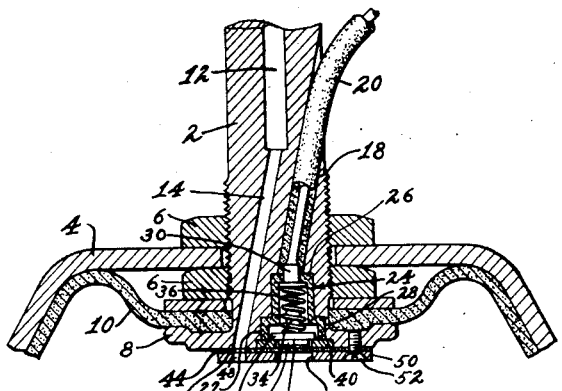
Figure 3:
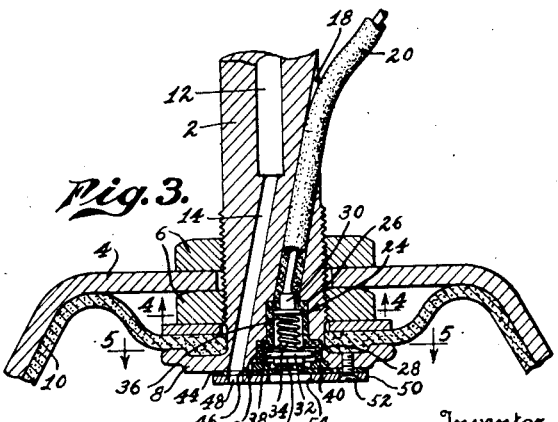

As seen more particularly in Figs. 2 and 3, the stem 2 may be provided with a central bore 12, which may communicate with a preferably inclined or offset passage or channel 14, leading to the interior of the tire 10, so that said tire may be placed under pneumatic pressure in the usual way, the usual valve and valve cap assembly 16 (Fig. 1) being provided for this purpose, and said stem may take any form in practice suggested or needed, so that the invention may be applied universally to all makes of wheels, tires and tire rims.

The stem 2 is provided with a cut-away portion 18, for the reception of the electric lead 20, which lead when energized as preferred, through the construction presently to be explained, will cause any conventional or novel form of signalling apparatus, not shown, to be actuated to indicate that a pre-determined or other fall of pressure within the tire 10 has been reached.

The stem 2 is also provided with a cut-out portion 22, preferably cylindrical and of varying diametrical cross-section, and which cut-out portion extends entirely through the end of said stem to the interior of the tire 10.

Positioned within the cut-out portion 22, is a suitable casing or housing designated generally by the reference numeral 24, which housing or casing is preferably constructed of insulating material, to insulate the various parts, hereinafter more particularly to be described, from the metallic support or stem 2, which forms a ground, the lead 20, energized in any suitable way, as hereinbefore explained, functioning to actuate any preferred form of indicating mechanism, Since such mechanism, except as it enters into the combination with my invention, forms no part thereof, further illustration and description are not deemed needed.

The casing or housing 24 is preferably of elongated form, and has a configuration which preferably adapts it to fit snugly within the cut-out portion 22, and is provided with a relatively long and relatively smaller width portion 26, and a relatively short and relatively larger width portion 28; and associated with the portion 26 in any way in practice preferred, is a terminal 30, associated as desired with the end of the lead 20.

Movable or floating within the portion 28 of the casing or housing 24 is a floating member, circuit closer or movable electrode 32, which has an elongated extension 34, preferably surrounded by a helical member or spring 36, which is in circuit with the terminal 30, said electrode 32 being also provided with a bridging or contact portion 38, the outer portion or periphery of which is adapted to engage or disengage with a stationary electrode 40, which may be of annular form and in circuit with the stem 2 to form a ground.

The annular member, annulus, or stationary electrode 40 is, of course, made of material of electric conductivity, such as brass, and the electric circuit is established through the lead 20 where the bridging member 38 makes contact with the stationary electrode 40.

It is necessary to control the movable electrode 32 so as to respond to the fluctuating pressures within the tire 10, and to this end said electrode may be provided with an extension 42 adapted to be engaged as in Fig. 3, with a resilient or flexible member 44, responsive to said fluctuating pressures within said tire, with the stationary electrode 40, or disengaged therefrom, as shown in Fig. 2, when a pre-determined pressure drop has been reached or the tire deflated.

The member 44 may be made of rubber or rubber composition, and is perforated as at 46, to align with a similar perforation 48 in a suitable securing device 50, for holding the parts just described in secured and detachable relation with the stem 2, any preferred means for this purpose, such as the screws 52, being provided. Said device 50 is provided with a suitable opening 52 for permitting the fluctuating pressures within the tire 10 to reach the member 44.

The operation of the device should now be clear. Should the pressure within the tire 10 drop to a predetermined amount, or the tire become deflated, the spring 34, in circuit with the terminal 30 connected to the lead 20, urges the movable electrode into contact with the stationary electrode 40, and the indicating mechanism operated, parts as in Fig. 2.

The tire is then inflated through the valve means 46, as usual, the air entering the tire 10 through the bore 12, passage 14, and perforations 46 and 48, causing the disk 44 to bulge as shown in Fig. 3, actuating the extension 42 to remove the movable electrode 32 from the stationary electrode 40, thus breaking the circuit with the lead 20, parts as in Fig. 3.

In accordance with the provisions of the patent statutes, I have described the principle of operation of my invention together with the apparatus, which I now consider to represent the best embodiment thereof; but I desire to have it understood that the apparatus shown is only illustrative, and that the invention can be carried out by other means.

I claim as my invention:

1. A pressure indicator valve comprising a tire valve stem provided with a central fluid pressure bore, and a fluid pressure passage straight throughout its length and positioned in inclined relation with respect to said bore, and in communication with the interior of said tire, said stem being also provided with a hollowed-out portion, an open-ended casing of insulating material positioned in said hollowed-out portion, a stationary electrode abutting one of the open ends of said casing, said stationary electrode being provided with an opening, a floating electrode in said casing, and adapted to make and break circuit with said stationary electrode, a resilient member closing said opening and adapted to move said floating electrode through said opening and in response to the varying pressures in said tire, means associated with said stem for holding said resilient member in position, means in said casing for opposing the movement of said floating electrode, an electric lead extending into said stem, and a terminal on said lead and extending through the other opening into said casing, said means for opposing the movement of said floating electrode being in circuit with said terminal.

2. In a pneumatic tire deflation indicator, a tire valve stem, a flange thereon, a housing of insulating material, in said stem, an annular stationary electrode in said flange and in electric circuit with said flange and said stem, a flexible diaphragm responsive to fluctuating pressures in said tire external of said flange and extending across said stationary electrode, means for holding said diaphragm in secured and detachable relation with said flange, a movable electrode in said housing, juxtaposed to said stationary electrode and normally out of contact therewith, an electric lead having a terminal positioned in one end of said housing, and resilient means of electrical conductivity in circuit with and engaging said terminal at one end and engaging said movable electrode at the other end to oppose the movement of said movable electrode.

3. A pneumatic tire deflation indicator, such as defined in claim 2, characterized by the provision of an extension on the movable electrode adapted to be engaged by the flexible diaphragm when said diaphragm is flexed by the pressure in the tire to hold said movable electrode out of contact with the stationary electrode.

4. In an electric signal, an elongated housing of insulating material having a first portion of relatively greater length and relatively shorter width, and a second portion of relatively shorter length and relatively greater width, a terminal extending into the outer end of said first portion, an electric lead connected to said terminal, an electric switch in said second portion of said housing, said switch comprising a floating electrode, an electric conductor in circuit with and having one end thereof in engagement with said terminal and its other end in engagement with said floating electrode for opposing the movement of said floating electrode, a stationary electrode juxtaposed externally to said housing and abutting the outer end of said second portion for making and breaking circuit between said electrodes, and an insulating member, responsive to fluctuating pressures for engaging or disengaging said floating electrode, whereby said circuit may be closed or opened.

5. An electric switch for a pressure indicator comprising a cylindrical housing of varying diametric cross section and constructed of insulating material, a terminal extending into one end of said housing, an electric lead connected to said terminal, an electrode movable in the relatively wider part of said housing, a stationary electrode abutting one end of said housing, a helical spring conductor in the relatively narrow part of said housing engaging said terminal at one end thereof, and at its other end said movable electrode for opposing the movement of said movable electrode and in circuit therewith and with said terminal, and a flexible diaphragm of insulating material adapted to respond to fluctuating pressures for engaging said electrodes to make and break circuit in response to said pressures.

6. In an electric switch, a support provided with a hollowed-out portion, an insulator casing in said hollowed-out portion, a terminal extending into one end of said casing, an electric lead connecting said terminal, a stationary electrode in said insulator casing and abutting the other end of said insulator casing, a movable electrode in said insulator casing and adapted to make and break circuit with said stationary electrode, spring means having one end contacting said terminal and in circuit with said terminal and having its other end contacting said movable electrode for opposing the movement thereof, a resilient member juxtaposed to one end of said support, and responsive to fluctuating pressures for engaging said movable electrode to make and break circuit with said stationary electrode, and means for holding said electrodes, casing and resilient member in secured and detachable relation with said support.

7. In an electric switch, an insulating housing, a terminal in one end of said housing, an electric lead connected to said terminal, an annular stationary electrode abutting the other end of said housing, a movable electrode in said other end of said housing, resilient means in said housing having one end in contact with said terminal and its other end in contact with said movable electrode and adapted to oppose the movement of said movable electrode and to establish a circuit between said terminal and said movable electrode, and an insulating flexible member for controlling the movement of said movable electrode, said member being adapted to engage and disengage said movable electrode through said annular stationary electrode.

8. In a device of the class described, a tire valve stem provided with a fluid pressure passage therethrough, a casing positioned in said stem and in offset relation with respect to said passage, an electric lead extending into said stem to one end of said casing, an electric terminal extending through said end of said casing and in circuit with said lead, an annular stationary electrode positioned on the other end of said casing, a movable electrode in said casing and adapted to make and break circuit with said stationary electrode, a resilient electrical conductor in said casing, at all times in circuit with said terminal and said movable electrode and adapted to oppose the movement of said movable electrode, a fluid pressure responsive resilient member juxtaposed to said stationary electrode and adapted to engage and disengage with said movable electrode through said annular stationary electrode, and means for holding said casing, said electrode, and said conductor in detachable relation with respect to said tire valve stem.

JOEL L. SWEZEY.